United States Patent
Ueda

(10) Patent No.: US 7,719,810 B2
(45) Date of Patent: May 18, 2010

(54) OVERVOLTAGE PROTECTION CIRCUIT AND ELECTRONIC DEVICE

(75) Inventor: Tadayoshi Ueda, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 11/808,361

(22) Filed: Jun. 8, 2007

(65) Prior Publication Data
US 2007/0291432 A1    Dec. 20, 2007

(30) Foreign Application Priority Data
Jun. 20, 2006    (JP)    ............................. 2006-170686

(51) Int. Cl.
*H02H 3/20*    (2006.01)
*H02H 9/04*    (2006.01)
*H02J 7/02*    (2006.01)

(52) U.S. Cl. .................. 361/91.1; 361/56; 361/111; 320/104

(58) Field of Classification Search ................ 361/91.1, 361/56, 111; 320/104
See application file for complete search history.

(56) References Cited

U.S. PATENT DOCUMENTS

| | | | | |
|---|---|---|---|---|
| 4,280,161 A | * | 7/1981 | Kuhn et al. ................ | 361/18 |
| 4,413,234 A | * | 11/1983 | Lupoli ...................... | 324/435 |
| 5,550,411 A | * | 8/1996 | Baker ....................... | 307/100 |
| 6,331,763 B1 | * | 12/2001 | Thomas et al. .......... | 320/136 |

FOREIGN PATENT DOCUMENTS

| | | |
|---|---|---|
| JP | 2002-118957 | 4/2002 |
| JP | 2002-218645 | 8/2002 |
| JP | 2002-313949 | 10/2002 |
| JP | 2003-075477 | 3/2003 |
| JP | 2003-303890 | 10/2003 |
| KR | 10-2005-0035376 | 4/2005 |

OTHER PUBLICATIONS

BC 107 General purpose small signal transistor, Data Sheet, Seme Lab, Mar. 1999, pp. 1 - 2.*
Japanese Notice of Submission of Opinion, May 21, 2009.
Korean Notice of Submission of Opinion, May 21, 2009.

* cited by examiner

*Primary Examiner*—Stephen W Jackson
*Assistant Examiner*—Zeev Kitov
(74) *Attorney, Agent, or Firm*—Dickstein Shapiro LLP

(57) ABSTRACT

A disclosed overvoltage protection circuit includes a power source input terminal of an electronic device, the power source input terminal being configured to receive a power source voltage; an internal power source terminal configured to supply power to internal circuits of the electronic device; a voltage blocking circuit connected between the power source input terminal and the internal power source terminal, the voltage blocking circuit being configured to prevent the power source voltage received at the power source input terminal from being provided; and a constant voltage output unit connected in parallel with the voltage blocking circuit, the constant voltage output unit being configured to output a constant voltage. In the event that the power source voltage received at the power source input terminal is higher than or equal to a predetermined voltage, the voltage blocking circuit blocks the power source voltage received at the power source input terminal.

7 Claims, 3 Drawing Sheets

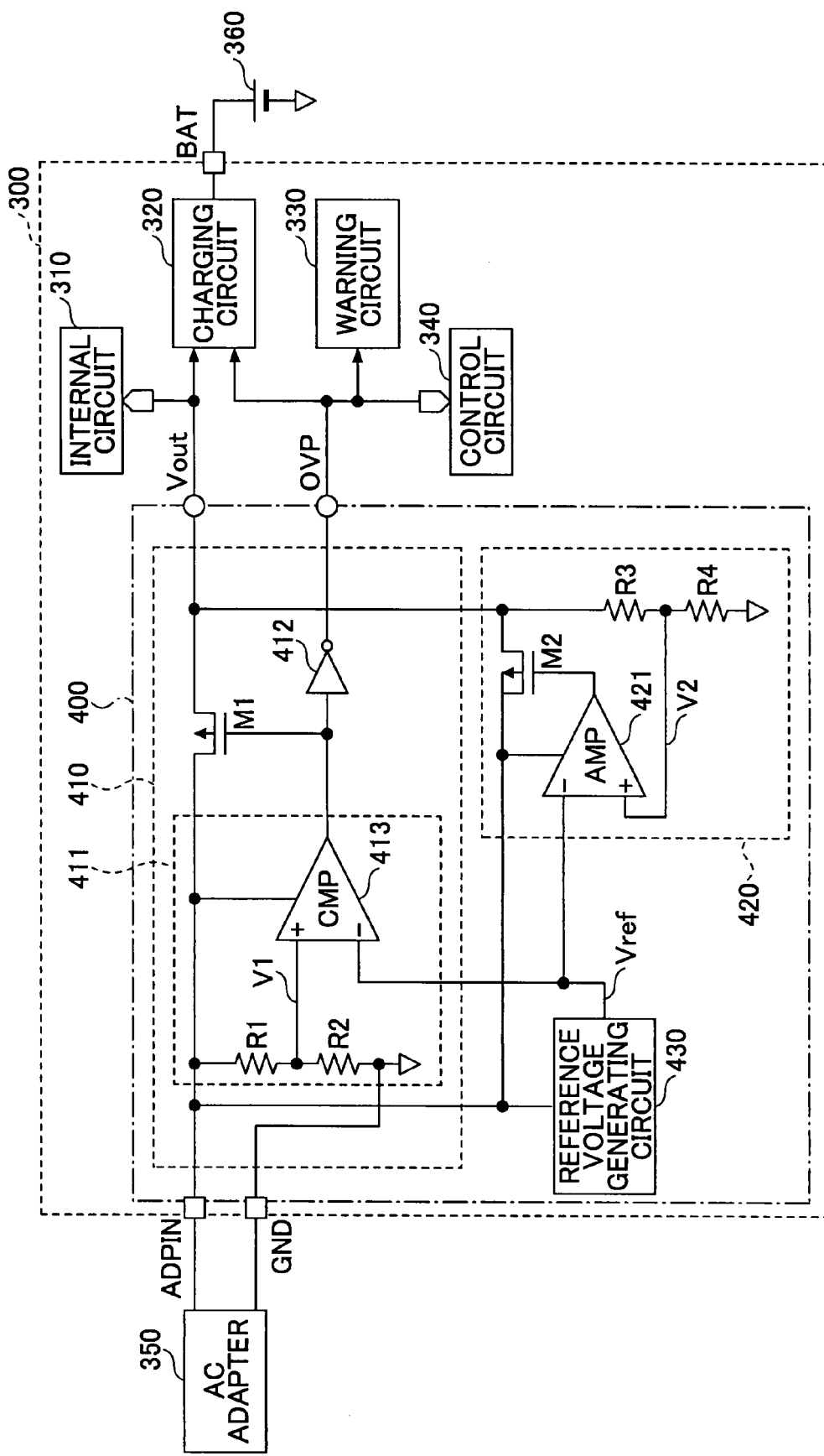

OVERVOLTAGE PROTECTION CIRCUIT AND ELECTRONIC DEVICE

BACKGROUND OF THE INVENTION

1. Field of the Invention

The present invention relates to an overvoltage protection circuit and an electronic device equipped with a built-in overvoltage protection circuit.

2. Description of the Related Art

In recent years and continuing, electronic devices such as mobile phones and digital cameras equipped with built-in secondary batteries are becoming popular. Such an electronic device is configured to receive power supplied from an AC adapter. The power from the AC adapter is also used to charge the built-in secondary battery. With the growing popularity of these electronic devices, AC adapters with different output voltages are becoming readily available. However, there are only a few variations in the shapes of the output terminals of the AC adapters. Accordingly, an electronic device may be incorrectly connected to an AC adapter that outputs an inappropriate voltage for that electronic device. For example, if an electronic device that operates at low voltage is connected to an AC adapter that outputs high voltage exceeding the withstand voltage of the semiconductor circuit provided in the electronic device, the semiconductor circuit in the electronic device will break down.

Japanese Laid-Open Patent Application No. 2002-218645 (Patent Document 1) discloses an overvoltage protection circuit that has been invented to avoid such a situation. FIG. 1 is a circuit diagram for describing the overvoltage protection circuit disclosed in Patent Document 1.

An overvoltage protection circuit 10 receives power supplied from an AC adapter 11. Output of the overvoltage protection circuit 10 is supplied to a device main unit 12.

The overvoltage protection circuit 10 includes resistances R11, R12 for detecting the output voltage of the AC adapter 11, a resistance R13 and a Zener diode D11 for generating a reference voltage, a comparator 14 for comparing the output voltage of the AC adapter 11 and the generated reference voltage, and a switch M11 that is caused to turn ON/OFF according to the output of the comparator 14. A resistance R14 is a bias resistance connected to the output of the comparator 14 and a diode D12 is a parasitic diode of a PMOS transistor comprising the switch M11.

When an appropriate voltage is output from the AC adapter 11 to the device main unit 12, the voltage of an input 1 of the comparator 14 is lower than the voltage of an input 2 of the comparator 14, and output of the comparator 14 becomes low (hereinafter, "L level"). Accordingly, the switch M11 is turned on and the output voltage of the AC adapter 11 is supplied to the device main unit 12.

If the AC adapter 11 outputs a high voltage that is inappropriate for the device main unit 12, the voltage of the input 1 of the comparator 14 becomes higher than or equal to the input 2, and the output of the comparator 14 becomes high (hereinafter, "H level"). Accordingly, the switch M11 is turned off and the output voltage of the AC adapter 11 is prevented from being supplied to the device main unit 12.

FIG. 2 is a circuit diagram for describing an overvoltage protection circuit disclosed in Japanese Laid-Open Patent Application No. 2002-313949 (Patent Document 2). This overvoltage protection circuit is integrated on part of a semiconductor substrate.

An integrated circuit 20 is fabricated by mounting an overvoltage protection circuit 21 on the same semiconductor substrate as a CMOS integrated circuit 22. Terminals 23, 24 are external terminals of the integrated circuit 20, which terminals are connected to a power source. Terminals 25, 26 are internal terminals of the integrated circuit 20 and act as power source terminals for the CMOS integrated circuit 22.

The overvoltage protection circuit 21 includes resistances R21, R22 for detecting the voltage of the power source, a PMOS transistor M21 and a resistance R23 serving as an inverter, and a switch M22.

When the voltage applied between the terminal 23 and the terminal 24 is an appropriate voltage, the voltage drop across the resistance R21 is less than a threshold voltage of the PMOS transistor M21, and therefore, the PMOS transistor M21 is turned off. This causes a connecting node between the drain of the PMOS transistor M21 and the resistance R23 to have a voltage of 0 V, so that the switch M22 configured with a PMOS transistor is turned on. Thus, the voltage applied on the terminal 23 is supplied to the terminal 25, so that this voltage is supplied to the CMOS integrated circuit 22.

When the voltage applied between the terminal 23 and the terminal 24 is an inappropriate voltage, the voltage drop across the resistance R21 increases. When this voltage drop exceeds the threshold voltage of the PMOS transistor M21, the PMOS transistor M21 is turned on. This causes the connecting node between the drain of the PMOS transistor M21 and the resistance R23 to have a voltage that is substantially the same potential as the voltage applied on the terminal 23. Accordingly, the switch M22 is turned off, so that the voltage applied to the terminal 23 is prevented from being supplied to the terminal 25. Japanese Laid-Open Patent Application No. 2003-303890 (Patent Document 3) discloses an overvoltage protection circuit in which the resistance R22 shown in FIG. 2 is replaced by a Zener diode.

Patent Document 1: Japanese Laid-Open Patent Application No. 2002-218645

Patent Document 2: Japanese Laid-Open Patent Application No. 2002-313949

Patent Document 3: Japanese Laid-Open Patent Application No. 2003-303890

However, in the above-described conventional overvoltage protection circuits, the switching element comprising the switch needs to be a transistor with high breakdown strength. Furthermore, all of the electric currents to be consumed by the device main unit 12 or the CMOS integrated circuit 22 need to flow through the switching element.

Such a transistor having high breakdown strength and superior current driving capabilities requires a large element area. For example, a transistor having a maximum rating of 15 V as the breakdown strength and a current driving capability of 850 mA requires an element area that is ten times as large as that of a transistor having a maximum rating of 7 V as the breakdown strength and the same current driving capability. Thus, in order to fabricate an IC with the conventional overvoltage protection circuit, an extremely large chip area is required, which leads to high cost.

Furthermore, when an inappropriate AC adaptor is connected to an electronic device, the power is prevented from being supplied to the main unit of the electronic device. Accordingly, the electronic device completely stops operating, which may cause a misperception that a failure has occurred in the electronic device.

SUMMARY OF THE INVENTION

The present invention provides an overvoltage protection circuit and an electronic device in which one or more of the above-described disadvantages are eliminated.

A preferred embodiment of the present invention provides an overvoltage protection circuit and an electronic device in which the chip area of the overvoltage protection circuit can be reduced, and part of the electronic device can be operated even if a high voltage is applied.

An embodiment of the present invention provides an overvoltage protection circuit including a power source input terminal of an electronic device, the power source input terminal being configured to receive a power source voltage; an internal power source terminal configured to supply power to internal circuits of the electronic device; a voltage blocking circuit connected between the power source input terminal and the internal power source terminal, the voltage blocking circuit being configured to prevent the power source voltage received at the power source input terminal from being provided; and a constant voltage output unit connected in parallel with the voltage blocking circuit, the constant voltage output unit being configured to output a constant voltage; wherein in the event that the power source voltage received at the power source input terminal is higher than or equal to a predetermined voltage, the voltage blocking circuit blocks the power source voltage received at the power source input terminal.

According to one embodiment of the present invention, an overvoltage protection circuit and an electronic device are provided, with which the chip area of the overvoltage protection circuit can be reduced, and part of the electronic device can be operated even if a high voltage is applied.

BRIEF DESCRIPTION OF THE DRAWINGS

Other objects, features and advantages of the present invention will become more apparent from the following detailed description when read in conjunction with the accompanying drawings, in which:

FIG. 3 is a circuit diagram of an electronic device equipped with a built-in overvoltage protection circuit according to an embodiment of the present invention.

DETAILED DESCRIPTION OF THE PREFERRED EMBODIMENTS

Figure 1:
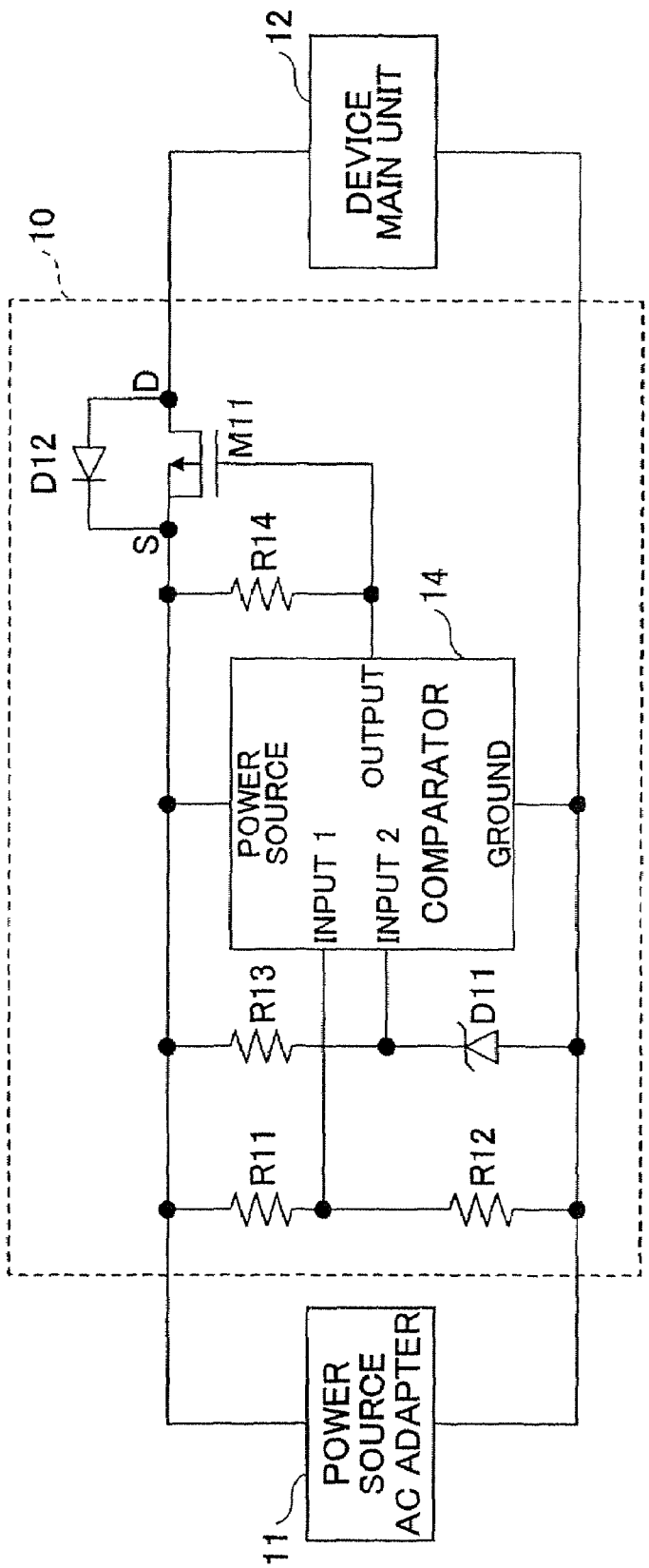
FIG. 1 is a circuit diagram of a conventional overvoltage protection circuit disclosed in Patent Document 1.
Figure 2:
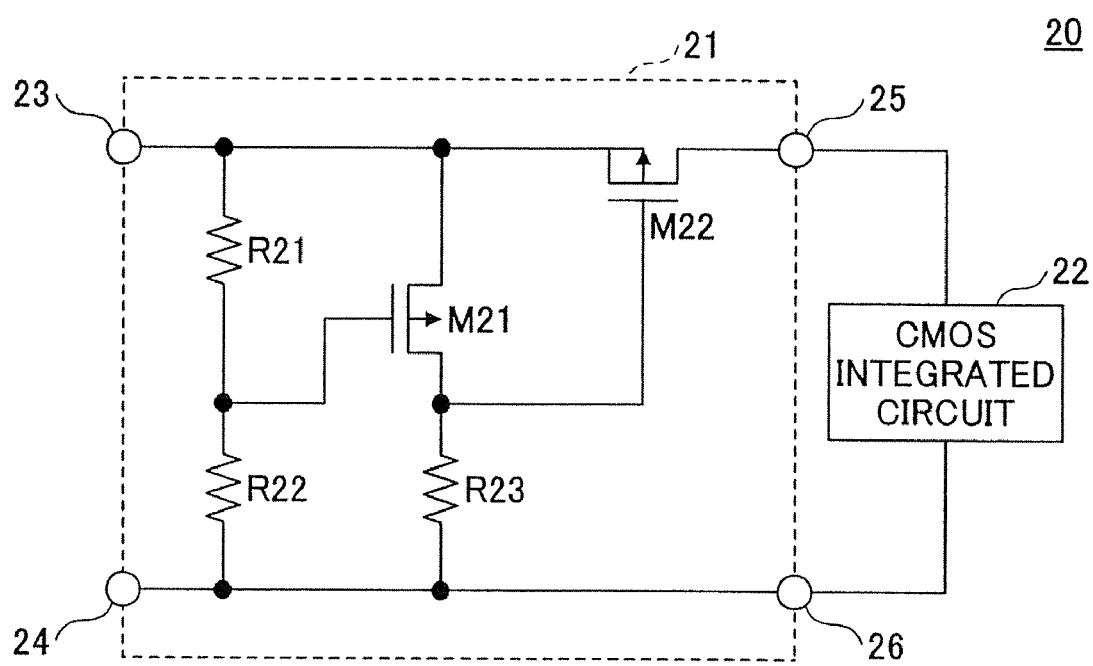
FIG. 2 is a circuit diagram of a conventional overvoltage protection circuit disclosed in Patent Document 2.

An electronic device equipped with a built-in overvoltage protection circuit has the following configuration. The overvoltage protection circuit is arranged between a power source input terminal that receives a power source voltage and an internal power source terminal that supplies power to an internal circuit of the electronic device. The overvoltage protection circuit includes a voltage blocking unit for blocking the power source voltage and a constant voltage circuit for outputting a constant voltage, which are connected in parallel. When a high voltage is applied to the power source input terminal, the voltage blocking unit blocks this voltage, so that only the constant voltage output from the constant voltage circuit is supplied to the internal power source terminal.

A description is given, with reference to the accompanying drawings, of an embodiment of the present invention.

FIG. 3 is a circuit diagram of an electronic device 300 equipped with a built-in overvoltage protection circuit 400 according to an embodiment of the present invention.

The electronic device 300 includes the overvoltage protection circuit 400, an internal circuit 310, a charging circuit 320, a warning circuit 330, and a control circuit 340. The electronic device 300 also includes a power source input terminal ADPIN to which an AC adapter 350 is connected and a power source voltage is applied, a ground terminal GND connected to ground, and a terminal BAT to which a secondary battery 360 is connected.

When the AC adapter 350 is connected to the electronic device 300 and voltage is applied to the power source input terminal ADPIN, the voltage is supplied to the internal circuit 310 via the overvoltage protection circuit 400. The internal circuit 310 operates by receiving this voltage. The function of the electronic device 300 is realized by the operation of the internal circuit 310. In the electronic device 300, the voltage output from the overvoltage protection circuit 400 is also supplied to the charging circuit 320. The charging circuit 320 uses this voltage to charge the secondary battery 360 connected to the terminal BAT.

The overvoltage protection circuit 400 blocks the voltage applied to the power source input terminal ADPIN in the event that the output voltage from the AC adapter 350 is inappropriately high. Accordingly, overvoltage is prevented from being applied to the internal circuit 310, etc. Details of the overvoltage protection circuit 400 are described below.

The internal circuit 310 realizes various functions of the electronic device 300. The charging circuit 320 is configured to charge the secondary battery 360 that is to be connected to the electronic device 300. The charging circuit 320 is controlled according to output from a voltage detecting circuit 411 included in the overvoltage protection circuit 400. The voltage detecting circuit 411 is described below. The warning circuit 330 sends a warning to the user of the electronic device 300 that an overvoltage has occurred, in the event that an inappropriately high voltage for the electronic device 300 is applied to the power source input terminal ADPIN. Similar to the charging circuit 320, the warning circuit 330 is also controlled according to output from the voltage detecting circuit 411 included in the overvoltage protection circuit 400. The control circuit 340 controls operations of the circuits in the electronic device 300, including the internal circuit 310, the charging circuit 320, and the warning circuit 330.

Next, the overvoltage protection circuit 400 is described.

The overvoltage protection circuit 400 includes a voltage blocking circuit 410, a constant voltage circuit 420, a reference voltage generating circuit 430, an internal power source terminal Vout, and an overvoltage signal terminal OVP, which terminals are inside the electronic device 300. In the overvoltage protection circuit 400, the voltage blocking circuit 410 and the constant voltage circuit 420 are connected in parallel between the power source input terminal ADPIN and the internal power source terminal Vout. When a voltage higher than or equal to a predetermined voltage is applied to the power source input terminal ADPIN, the voltage blocking circuit 410 blocks this voltage. Accordingly, the overvoltage protection circuit 400 outputs, from the internal power source terminal Vout, only a constant voltage output by the constant voltage circuit 420, and supplies this constant voltage to the internal circuit 310.

The value of the predetermined voltage is specified beforehand when the overvoltage protection circuit 400 is designed. The predetermined voltage in the present embodiment is an appropriate voltage that does not exceed the withstand voltage of the electronic device 300. The predetermined voltage of the present embodiment is preferably lower than or equal to the lowest withstand voltage among the withstand voltages of transistors employed in the internal circuit 310. Specific values of the withstand voltage are described below.

The voltage blocking circuit 410 includes a switching transistor M1, the voltage detecting circuit 411, and an inverter circuit 412. The switching transistor M1 comprises a PMOS transistor, and is connected between the power source input terminal ADPIN and the internal power source terminal Vout. Output of the voltage detecting circuit 411 is applied to the gate of the switching transistor M1.

The voltage detecting circuit 411 is configured with a comparator 413 and resistances R1, R2 that are connected in series. The resistances R1, R2 connected in series are connected between the power source input terminal ADPIN and GND. A voltage V1 of a connecting node between the resistance R1 and the resistance R2 is applied to the noninverting input terminal of the comparator 413.

A reference voltage Vref output from the reference voltage generating circuit 430 is applied to the inverting input terminal of the comparator 413. Output from the comparator 413 becomes the output from the voltage detecting circuit 411. This output is applied to the gate of the switching transistor M1 and is also applied to the overvoltage signal terminal OVP via the inverter circuit 412.

The withstand voltage of the switching transistor M1 according to the present embodiment is lower than or equal to the lowest withstand voltage among the withstand voltages of transistors employed in the internal circuit 310. The drain current of the switching transistor M1 has the capacity for supplying the maximum current consumed by the electronic device 300. By employing such a transistor as the switching transistor M1, the size of the element corresponding to the switching transistor M1 can be made compact.

The withstand voltage of a transistor (not shown) comprising the comparator 413 is higher than or equal to twice the lowest withstand voltage among the withstand voltages of transistors employed in the internal circuit 310. Specific values of the withstand voltage are described below.

Next, the configuration of the constant voltage circuit 420 is described.

The constant voltage circuit 420 includes an output transistor M2 employing a PMOS transistor, an error amplifying circuit 421, and resistances R3, R4 connected in series.

The source of the output transistor M2 is connected to the power source input terminal ADPIN and the drain of the output transistor M2 is connected to the internal power source terminal Vout. The resistance R3 and the resistance R4 connected in series are connected between the internal power source terminal Vout and ground. A voltage V2 of a connecting node between the resistance R3 and the resistance R4 is applied to the noninverting input terminal of the error amplifying circuit 421. The reference voltage Vref output from the reference voltage generating circuit 430 is applied to the inverting input terminal of the error amplifying circuit 421. Output from the error amplifying circuit 421 is applied to the gate of the output transistor M2.

In this example, the rating output voltage of the constant voltage circuit 420 has the same potential as the lowest withstand voltage among the withstand voltages of transistors employed in the internal circuit 310. The rating output voltage of the constant voltage circuit 420 can be set to a voltage that is slightly lower than the lowest withstand voltage among the withstand voltages of transistors employed in the internal circuit 310, in consideration of variations in the output voltage. The rating output voltage of the constant voltage circuit 420 can be just large enough to operate part of the internal circuit 310. By designing the constant voltage circuit 420 in the above-described manner, the element area of the output transistor M2 can be made small.

Similar to the case of the comparator 413, the withstand voltage of the transistor included in the constant voltage circuit 420 is higher than or equal to twice the lowest withstand voltage among the withstand voltages of transistors employed in the internal circuit 310. Specific values of the withstand voltage are described below.

Next, operations of the overvoltage protection circuit 400 are described.

First, a description is given of the operation of the overvoltage protection circuit 400 in a case where the output voltage from the AC adapter 350 is lower than the predetermined voltage. In this case, the voltage applied to the power source input terminal ADPIN is lower than the predetermined voltage.

A voltage V1 applied to the noninverting input terminal of the comparator 413 is lower than the reference voltage Vref, and therefore, the output from the comparator 413 becomes L level. Accordingly, the switching transistor M1 is turned on. As a result, output from the inverter circuit 412 becomes H level, and an H level signal is output from the overvoltage signal terminal OVP.

When the switching transistor M1 is turned on, the power source input terminal ADPIN and the internal power source terminal Vout become electrically coupled with each other, so that the output voltage from the AC adapter 350 is supplied to the internal circuit 310 via the internal power source terminal Vout.

In this status, the output voltage from the constant voltage circuit 420 becomes lower than the rating output voltage, and the output transistor M2 is turned on.

That is, when the output voltage from the AC adapter 350 is appropriate, both the switching transistor M1 and the output transistor M2 are turned on, and the voltage is supplied from the power source input terminal ADPIN to the internal power source terminal Vout. Accordingly, for example, the maximum permissible current capacity of the switching transistor M1 can be less than the maximum consumption current of the electronic device 300.

Next, a description is given of the operation of the overvoltage protection circuit 400 in a case where the output voltage from the AC adapter 350 is higher than or equal to the predetermined voltage. In this case, the voltage applied to the power source input terminal ADPIN is higher than or equal to the predetermined voltage according to the present embodiment.

The voltage V1 applied to the noninverting input terminal of the comparator 413 rises, and becomes higher than the reference voltage Vref applied to the inverting input terminal. Therefore, the output of the comparator 413 becomes H level. Accordingly, the switching transistor M1 is turned off. As a result, the voltage applied from the AC adapter 350 to the power source input terminal ADPIN is blocked. Furthermore, the output from the comparator 413 is inverted by the inverter circuit 412, and is output as an L level signal from the overvoltage signal terminal OVP.

During this operation, the constant voltage circuit 420 is operating, and the rating output voltage output from the constant voltage circuit 420 is supplied to the internal power source terminal Vout.

Accordingly, even when the voltage applied to the power source input terminal ADPIN is blocked, the constant voltage output from the constant voltage circuit 420 is supplied to the internal circuit 310. Therefore, part of the internal circuit 310 that is operable by the constant voltage can be operated. Thus, even if an AC adapter that outputs a high voltage is erroneously connected to the electronic device 300, and a high voltage that is higher than or equal to the predetermined voltage is applied to the power source input terminal ADPIN, the operation of the electronic device 300 does not completely stop. Furthermore, the circuit in the electronic device 300 that operates by the constant voltage can be the circuit that realizes a function of the electronic device 300 that is most frequently used.

The following describes specific examples of the predetermined voltage and the withstand voltages of the transistors employed in the above-described circuits according to the present embodiment. The output voltage of the AC adapter 350, which is an appropriate voltage that does not exceed the withstand voltage of the electronic device 300, is 6 V. This means that the predetermined voltage in the present embodiment is 6 V. The lowest withstand voltage among the withstand voltages of transistors employed in the internal circuit 310, the withstand voltage of the switching transistor M1, and the rating output voltage of the constant voltage circuit 420 is 7 V. Accordingly, in the present embodiment, the withstand voltage of the transistor included in the constant voltage circuit 420 and the withstand voltage of the transistor included in the comparator 413 are to be higher than or equal to two times 7 V, i.e., higher than or equal to 14 V. Therefore, in the present embodiment, the withstand voltage of the transistor included in the constant voltage circuit 420 and the withstand voltage of the transistor included in the comparator 413 are specified as 15 V.

By employing the above-described transistors, the element size of the switching transistor M1 can be greatly reduced, and the element area required for the constant voltage circuit 420 can also be reduced. Thus, the total element area of the switching transistor M1 and the constant voltage circuit 420 according to the present embodiment can be greatly reduced compared to the element area of a conventional switching element, and the chip area of the overvoltage protection circuit 400 can thus be reduced.

Furthermore, in the present embodiment, the rating output voltage of the constant voltage circuit 420 is specified to be equal to the lowest withstand voltage among the withstand voltages of transistors employed in the internal circuit 310. Therefore, the electronic device 300 can use an AC adapter having an output voltage that is twice the withstand voltage of the electronic device 300, without causing the transistors employed in the internal circuit 310 to break down.

Next, the charging circuit 320, the warning circuit 330, and the control circuit 340 in the electronic device 300 are described.

The control circuit 340 controls the charging circuit 320 and the warning circuit 330 based on output signals from the overvoltage signal terminal OVP, which signals are generated by inverting output of the voltage detecting circuit 411.

When the voltage applied to the power source input terminal ADPIN is higher than or equal to the predetermined voltage, the voltage detecting circuit 411 outputs an H level signal. This signal is turned into an L level signal at the inverter circuit 412, and output from the overvoltage signal terminal OVP.

When this L level signal is received, the control circuit 340 causes the charging circuit 320 to stop charging the secondary battery 360. The charging operation that is stopped can be a rapid charging operation performed with a large current or a regular charging operation. By stopping the charging operation, it is possible to greatly reduce the current consumed by the electronic device 300 while the electronic device 300 is operating with only the rating output voltage of the constant voltage circuit 420. Therefore, functions of the electronic device 300 other than charging can be realized.

When an L level signal is received from the overvoltage signal terminal OVP, the control circuit 340 can block the power from being supplied to circuits other than minimum circuits required for operating the electronic device 300. Accordingly, it is possible to greatly reduce the current consumed by the electronic device 300 while the electronic device 300 is operating with only the rating output voltage of the constant voltage circuit 420.

When an L level signal is received from the overvoltage signal terminal OVP, the control circuit 340 causes the warning circuit 330 to send a warning of an overvoltage status to the user of the electronic device 300. The warning circuit 330 includes, for example, a not shown LED (Light Emitting Diode). When the voltage applied to the power source input terminal ADPIN becomes an overvoltage, a warning of the overvoltage can be indicated to the user of the electronic device 300 by lighting the LED.

Accordingly, if the AC adapter 350 is an inappropriate AC adapter that outputs a high voltage exceeding the withstand voltage of the electronic device 300, the user of the electronic device 300 can receive a warning.

The present invention is not limited to the specifically disclosed embodiment, and variations and modifications may be made without departing from the scope of the present invention.

The present application is based on Japanese Priority Patent Application No. 2006-170686, filed on Jun. 20, 2006, the entire contents of which are hereby incorporated by reference.

What is claimed is:

1. An overvoltage protection circuit comprising:
a power source input terminal of an electronic device, the power source input terminal being configured to receive a power source voltage;
an internal power source terminal configured to supply power to internal circuits of the electronic device;
a voltage blocking circuit connected between the power source input terminal and the internal power source terminal, the voltage blocking circuit being configured to prevent the power source voltage received at the power source input terminal from being provided; and
a constant voltage output unit connected in parallel with the voltage blocking circuit, the constant voltage output unit being configured to provide an un-interrupted power supply and output a constant voltage; wherein
in the event that the power source voltage received at the power source input terminal is higher than or equal to a predetermined voltage, the voltage blocking circuit blocks the power source voltage received at the power source input terminal, the voltage blocking circuit unblocks the power source voltage received at the power source input terminal once the power source voltage received at the power source input terminal is lower than the predetermined voltage, and wherein the predetermined voltage and the constant voltage are lower than or substantially equal to a lowest withstand voltage among withstand voltages of transistors employed in the internal circuits, and wherein the voltage blocking circuit includes a switching transistor and the constant voltage output unit includes an output transistor, the switching transistor and the output transistor are connected in parallel with each other.

2. The overvoltage protection circuit according to claim 1, further comprising a control unit configured to control the power supplied to the internal circuits.

3. The overvoltage protection circuit according to claim 1, wherein the voltage blocking circuit further comprises a voltage detecting unit configured to detect whether or not the power source voltage received at the power source input terminal is higher than or equal to the predetermined voltage, and wherein the switching transistor of the voltage blocking circuit is configured to be switched on/off according to output from the voltage detecting unit, wherein:
  a withstand voltage of the switching transistor is higher than or substantially equal to a lowest withstand voltage among withstand voltages of transistors employed in the internal circuits; and
  a withstand voltage of a transistor included in the constant voltage output unit is higher than the withstand voltage of the switching transistor.

4. The overvoltage protection circuit according to claim 3, wherein:
  the withstand voltage of the transistor included in the constant voltage output unit is substantially equal to twice the withstand voltage of the switching transistor.

5. An electronic device comprising:
  an overvoltage protection circuit;
  a connection terminal to which a secondary battery is connected; and
  a charger configured to charge the secondary battery; wherein:
  the overvoltage protection circuit comprises the overvoltage protection circuit according to claim 1.

6. The electronic device according to claim 5, wherein:
  the overvoltage protection circuit comprises:
  a power source input terminal of an electronic device, the power source input terminal being configured to receive a power source voltage;
  an internal power source terminal configured to supply power to internal circuits of the electronic device;
  a voltage blocking circuit connected between the power source input terminal and the internal power source terminal, the voltage blocking circuit being configured to prevent the power source voltage received at the power source input terminal from being provided; and
  a constant voltage output unit connected in parallel with the voltage blocking circuit, the constant voltage output unit being configured to provide an un-interrupted power supply and output a constant voltage; wherein
  in the event that the power source voltage received at the power source input terminal is higher than or equal to a predetermined voltage, the voltage blocking circuit blocks the power source voltage received at the power source input terminal, the voltage blocking circuit unblocks the power source voltage received at the power source input terminal once the power source voltage received at the power source input terminal is lower than the predetermined voltage, and wherein the predetermined voltage and the constant voltage are lower than or substantially equal to a lowest withstand voltage among withstand voltages of transistors employed in the internal circuits, and wherein the voltage blocking circuit includes a switching transistor and the constant voltage output unit includes an output transistor, the switching transistor and the output transistor are connected in parallel with each other,
  wherein the voltage blocking circuit further comprises a voltage detecting unit configured to detect whether or not the power source voltage received at the power source input terminal is higher than or equal to the predetermined voltage, and wherein the switching transistor of the voltage blocking circuit is configured to be switched on/off according to output from the voltage detecting unit, wherein:
    a withstand voltage of the switching transistor is higher than or substantially equal to a lowest withstand voltage among withstand voltages of transistors employed in the internal circuits, and
    a withstand voltage of a transistor included in the constant voltage output unit is higher than the withstand voltage of the switching transistor; and
  the charger is caused to stop charging the secondary battery according to the output from the voltage detecting unit.

7. The electronic device according to claim 5, further comprising:
  a warning unit configured to output a warning that the power source voltage received at the power source input terminal is higher than or equal to the predetermined voltage; wherein:
  the overvoltage protection circuit comprises:
  a power source input terminal of an electronic device, the power source input terminal being configured to receive a power source voltage;
  an internal power source terminal configured to supply power to internal circuits of the electronic device;
  a voltage blocking circuit connected between the power source input terminal and the internal power source terminal, the voltage blocking circuit being configured to prevent the power source voltage received at the power source input terminal from being provided; and
  a constant voltage output unit connected in parallel with the voltage blocking circuit, the constant voltage output unit being configured to provide an un-interrupted power supply and output a constant voltage; wherein
  in the event that the power source voltage received at the power source input terminal is higher than or equal to a predetermined voltage, the voltage blocking circuit blocks the power source voltage received at the power source input terminal, the voltage blocking circuit unblocks the power source voltage received at the power source input terminal once the power source voltage received at the power source input terminal is lower than the predetermined voltage, and wherein the predetermined voltage and the constant voltage are lower than or substantially equal to a lowest withstand voltage among withstand voltages of transistors employed in the internal circuits, and wherein the voltage blocking circuit includes a switching transistor and the constant voltage output unit includes an output transistor, the switching transistor and the output transistor are connected in parallel with each other,
  wherein the voltage blocking circuit further comprises a voltage detecting unit configured to detect whether or not the power source voltage received at the power source input terminal is higher than or equal to the predetermined voltage, and wherein the switching transistor of the voltage blocking circuit is configured to be switched on/off according to output from the voltage detecting unit, wherein:
    a withstand voltage of the switching transistor is higher than or substantially equal to a lowest withstand voltage among withstand voltages of transistors employed in the internal circuits, and
    a withstand voltage of a transistor included in the constant voltage output unit is higher than the withstand voltage of the switching transistor; and
  the warning unit outputs the warning based on the output from the voltage detecting unit.

* * * * *